United States Patent
Nakagawa et al.

(10) Patent No.: US 11,485,257 B2
(45) Date of Patent: Nov. 1, 2022

(54) VEHICLE WITH IMPROVED SEAT SWIVEL LOCK MECHANISM

(71) Applicant: TOYOTA JIDOSHA KABUSHIKI KAISHA, Toyota (JP)

(72) Inventors: Shuji Nakagawa, Toyota (JP); Yuji Shintaku, Toyota (JP); Katsuhiko Nakajima, Nissin (JP); Shigeki Otsuka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 291 days.

(21) Appl. No.: 16/743,166

(22) Filed: Jan. 15, 2020

(65) Prior Publication Data

US 2020/0247280 A1 Aug. 6, 2020

(30) Foreign Application Priority Data

Feb. 1, 2019 (JP) .............................. JP2019-017489

(51) Int. Cl.
| | |
|---|---|
| *B60N 2/14* | (2006.01) |
| *B60W 10/30* | (2006.01) |
| *G01G 19/414* | (2006.01) |
| *G05D 1/02* | (2020.01) |
| *B60N 2/75* | (2018.01) |
| *B60W 40/13* | (2012.01) |
| *B60N 2/90* | (2018.01) |

(52) U.S. Cl.
CPC ............. *B60N 2/146* (2013.01); *B60N 2/797* (2018.02); *B60W 10/30* (2013.01); *G01G 19/414* (2013.01); *G05D 1/021* (2013.01); *B60N 2/753* (2018.02); *B60N 2002/924* (2018.02); *B60N 2002/948* (2018.02); *B60N 2002/952* (2018.02); *B60W 2040/1315* (2013.01)

(58) Field of Classification Search
CPC ........ B60N 2/146; B60N 2/797; B60N 2/753; B60N 2002/952; B60N 2002/924; B60N 2002/948; B60W 10/30; B60W 2040/1315; G04G 19/414; G05D 1/021
USPC ....................................................... 296/65.07
See application file for complete search history.

(56) References Cited

U.S. PATENT DOCUMENTS

| | | | |
|---|---|---|---|
| 5,170,364 A * | 12/1992 | Gross ....................... | A47C 4/54 702/139 |
| 7,121,608 B2 * | 10/2006 | Billger ..................... | B60N 2/38 297/344.22 |
| 2010/0276973 A1 | 11/2010 | Zenk et al. | |

(Continued)

FOREIGN PATENT DOCUMENTS

| | | |
|---|---|---|
| CN | 205457381 U | 8/2016 |
| CN | 107054261 A | 8/2017 |

(Continued)

*Primary Examiner* — Hilary L Gutman
(74) *Attorney, Agent, or Firm* — Dickinson Wright, PLLC (57) ABSTRACT

A vehicle proposed herein includes a swivel, a lock mechanism selectively locking and unlocking the swivel, a seat mounted on the swivel, a plurality of surface pressure sensors each disposed along an outer surface of the seat and detecting a pressure distribution within a predetermined area of the outer surface, and a controller configured to cause the lock mechanism to be unlocked based on a change in pressure distribution or a surface pressure that is detected by any of the plurality of surface pressure sensors.

8 Claims, 6 Drawing Sheets

(56) References Cited

U.S. PATENT DOCUMENTS

| | | | |
|---|---|---|---|
| 2013/0193729 A1* | 8/2013 | VanMiddendorp | B60N 2/0228 297/311 |
| 2013/0275006 A1* | 10/2013 | Ystueta | B60N 2/0244 701/49 |
| 2015/0223890 A1* | 8/2015 | Miller | G06F 21/6245 705/2 |
| 2018/0251955 A1* | 9/2018 | Wynkoop | B60N 2/146 |

FOREIGN PATENT DOCUMENTS

| | | | | |
|---|---|---|---|---|
| CN | 206520509 U | | 9/2017 | |
| DE | 10152958 A1 | * | 8/2003 | G01G 19/4142 |
| DE | 10312119 A1 | * | 10/2003 | B60N 2/0248 |
| DE | 102007053119 A1 | * | 5/2009 | B60N 2/914 |
| DE | 102017208209 A1 | * | 11/2018 | B60N 2/0244 |
| DE | 102020124991 A1 | * | 4/2021 | B60K 28/04 |
| EP | 3153346 A1 | | 4/2017 | |
| FR | 3095382 A1 | * | 10/2020 | B60N 2/79 |
| JP | H02112542 U | * | 9/1990 | |
| JP | H10-236189 A | | 9/1998 | |
| JP | 2009149220 A | | 7/2009 | |
| JP | 2011083319 A | | 4/2011 | |
| JP | 2012-235839 A | | 12/2012 | |
| JP | 2015039913 A | | 3/2015 | |
| JP | 2016218613 A | | 12/2016 | |
| JP | 2018136241 A | | 8/2018 | |
| JP | 2018169315 A | | 11/2018 | |
| JP | 2018197091 A | | 12/2018 | |
| JP | 6769194 B2 | * | 10/2020 | |
| WO | WO-2008071284 A1 | * | 6/2008 | B60N 2/0244 |
| WO | WO-2009059768 A1 | * | 5/2009 | B60N 2/0244 |

* cited by examiner

VEHICLE WITH IMPROVED SEAT SWIVEL LOCK MECHANISM

CROSS REFERENCE TO RELATED APPLICATIONS

The present application claims priority from Japanese Patent Application No. 2019-017489 filed on Feb. 1, 2019, which is incorporated by reference herein in its entirety.

BACKGROUND

The present disclosure relates to a vehicle.

JP 2016-218613 A discloses an automobile capable of automated driving, in which the direction in which a seated occupant is facing is determined from a detected swiveling state and a detected reclined state of the seat, and a display arranged in the determined direction is determined to be the display to be operated. It is described that a seat cushion is fitted swivelably relative to the floor of the automobile. It is also described that the driver arranges the driver seat in his/her preferred state.

The publication discloses that, for example, the driver seat can be arranged so as to face toward the right side of the automobile or arranged in such a state that the seat back is reclined. When the driver seat is arranged, a controller detects a swiveling state of the seat cushion from a swiveling detection sensor. Likewise, the controller detects a reclined state of the seat back from an inclination detection sensor. When these are detected, the controller can determine the direction in which the driver seated on the driver seat is facing, from a database pre-stored in the controller itself. In this way, the controller is able to determine that the driver is facing to the right side. Next, the controller turns on the power of the display that is disposed in the direction in which the driver is facing. In this case, because the controller determines that the driver is facing to the right side, the controller turns the power of one of the displays that is disposed to be the right middle one. Such is disclosed in the publication.

In addition, capacitive-type surface pressure sensors are proposed in, for example, JP 2018-136241 A and JP 2018-169315 A as an example of surface pressure sensor.

SUMMARY

It should be pointed out that JP 2016-218613 A does not mention how an occupant can swivel a seat. With regard to how an occupant should swivel a seat, the present inventors believe that it is desirable to achieve a smooth operability according to the occupant's intention. The present inventors also believe that it is desirable to simplify the switches for swiveling.

In one embodiment of the present disclosure, a vehicle includes: a swivel; a lock mechanism locking and unlocking the swivel to switch the swivel between a locked state and an unlocked state; a seat mounted on the swivel; a plurality of surface pressure sensors, each disposed along an outer surface of the seat and detecting a pressure distribution within a predetermined area of the outer surface; and a controller configured to cause the lock mechanism to be unlocked based on a change in pressure distribution or a surface pressure that is detected by any of the plurality of surface pressure sensors.

This eliminates the need for additionally providing a manual operation part such as a switch or a lever separately from the seat.

Herein, the seat may include a cushion portion including a cushion surface disposed facing upward, and a seat back portion, disposed at a rear of the cushion portion, and including a backrest surface disposed facing forward. In this case, the plurality of surface pressure sensors may include a first surface pressure sensor disposed along the cushion surface and a second surface pressure sensor disposed along the backrest surface. The controller may be configured to cause the lock mechanism to be unlocked based on a change in pressure distribution that is detected by the first surface pressure sensor and on a change in pressure distribution that is detected by the second surface pressure sensor.

In this case, the controller may be configured to execute: obtaining a shift amount of a center of gravity acting on the cushion surface based on a change in pressure distribution that is detected by the first surface pressure sensor; obtaining a shift amount of a center of load acting on the backrest surface based on a change in pressure distribution that is detected by the second surface pressure sensor; and causing the lock mechanism to be unlocked if the shift amount of the center of gravity is greater than a predetermined threshold value and the shift amount of the center of load is greater than a predetermined threshold value.

The seat may include: a cushion portion including a cushion surface disposed facing upward; a seat back portion, disposed at a rear of the cushion portion, and including a backrest surface disposed facing forward; and an arm rest portion disposed on a side of the seat back portion and extending forward. In this case, the plurality of surface pressure sensors may include a first surface pressure sensor disposed along the cushion surface and a third surface pressure sensor disposed on an outer peripheral surface of the arm rest portion. Furthermore, the controller may be configured to cause the lock mechanism to be unlocked based on a change in pressure distribution that is detected by the second surface pressure sensor and on a change in pressure distribution or a surface pressure that is detected by the third surface pressure sensor.

The plurality of surface pressure sensors may include a second surface pressure sensor disposed along the backrest surface, and a third surface pressure sensor disposed along an outer peripheral surface of the arm rest portion. In this case, the controller may be configured to cause the lock mechanism to be unlocked based on a change in pressure distribution that is detected by the second surface pressure sensor and on a change in pressure distribution or a surface pressure that is detected by the third surface pressure sensor.

In this case, the plurality of surface pressure sensors may include a first surface pressure sensor disposed along the cushion surface, a second surface pressure sensor disposed along the backrest surface, and a third surface pressure sensor disposed on an outer peripheral surface of the arm rest portion. The controller may be configured to cause the lock mechanism to be unlocked based on a change in pressure distribution that is detected by the first surface pressure sensor, on a change in pressure distribution that is detected by the second surface pressure sensor, and on a change in pressure distribution or a surface pressure that is detected by the third surface pressure sensor.

DETAILED DESCRIPTION

The following describes embodiments of a vehicle disclosed herein. It should be noted, however, that the embodiments described herein are, of course, not intended to limit the present invention. The present invention is not limited to the embodiments described herein unless specifically stated otherwise. The features and components that exhibit the same effects are denoted by the same reference symbols as appropriate, and the description thereof will not be repeated. The directions in the drawings, such as up, down, left, right, front, and rear, are indicated by arrows identified by the letters U, D, L R, F, and Rr, respectively, as appropriate. Herein, the heading direction of the vehicle during normal traveling is defined as "front".

Seat 10

Figure 1:
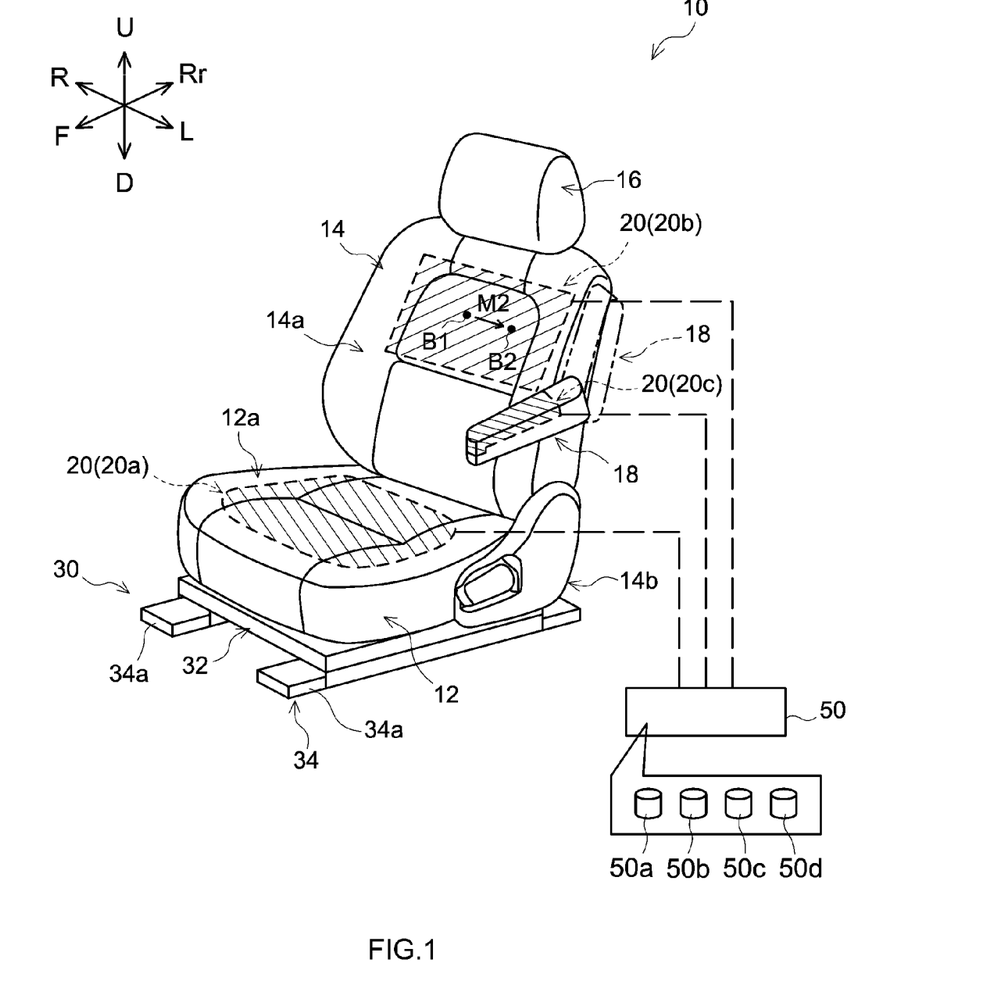
FIG. 1 is a perspective view schematically illustrating a seat 10 of a vehicle disclosed herein.

FIG. 1 is a perspective view schematically illustrating a seat 10 of a vehicle disclosed herein.

As illustrated in FIG. 1, the seat 10 of the vehicle disclosed herein includes a cushion portion 12, a seat back portion 14, a headrest portion 16, an arm rest portion 18, surface pressure sensors 20, and a base 30 to which the seat 10 is mounted. The base 30 includes a swivel 32 and a lock mechanism 33 (see FIGS. 3 and 4). The vehicle includes a controller 50. The controller 50 is configured to cause the lock mechanism 33 to switch between a locked state and an unlocked state based on a change in pressure distribution detected by any of the surface pressure sensors 20.

Herein, as illustrated in FIG. 1, the cushion portion 12 includes a cushion surface 12a disposed facing upwardly. The cushion surface 12a is a seat surface on which an occupant (not shown) is to be seated.

The seat back portion 14 is disposed at the rear of the cushion portion 12. The seat back portion 14 includes a backrest surface 14a disposed facing forward. The seat back portion 14 may be mounted via a reclining mechanism 14b provided at the rear of the cushion portion 12 so that it can pivot forward and rearward relative to the cushion portion 12 about a rear portion of the cushion portion 12 being the pivot axis.

The headrest portion 16 is mounted on top of the seat back portion 14. The headrest portion 16 supports the head of an occupant from the rear.

The arm rest portion 18 is disposed on a side of the seat back portion 14. In this embodiment, the arm rest portion 18 is attached to a side of the seat back portion 14 via a pivot mechanism. As indicated by the solid line and the dashed line in FIG. 1, the arm rest portion 18 is capable of changing its orientation relative to the seat back portion 14, between a forward extending state and an upward pivoting state.

Surface Pressure Sensor 20

Figure 2:
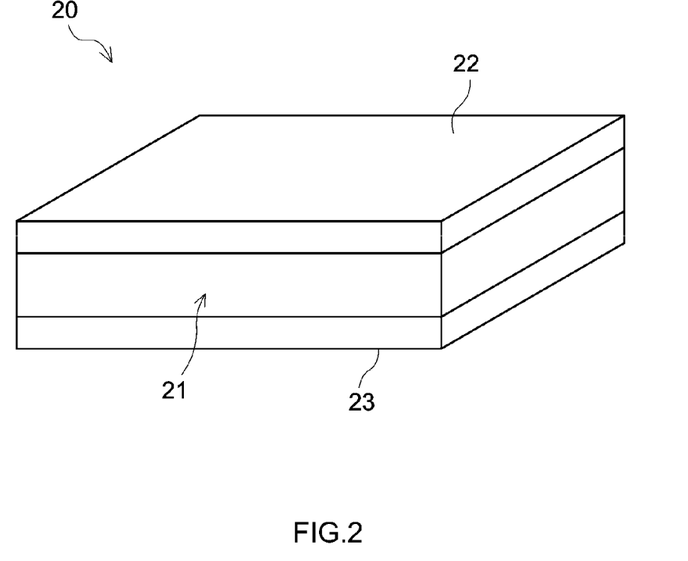
FIG. 2 is a perspective view schematically illustrating a surface pressure sensor 20.

Each of the surface pressure sensors 20 is a sensor that obtains a pressure distribution within a predetermined area. Various types of sensors that may be used for such a surface pressure sensor 20 have been proposed by, for example, Sumitomo Riko Co., Ltd. Various sheet-shaped surface pressure sensors provided with cushioning characteristics have also been proposed. Here, FIG. 2 is a perspective view schematically illustrating a surface pressure sensor 20. As illustrated in FIG. 2, such a surface pressure sensor 20 includes, for example, a dielectric layer 21 and a pair of sheet-shaped electrodes 22 and 23 that are overlapped on respective surfaces of the dielectric layer 21 and opposed to each other.

The dielectric layer 21 employs an elastomer or resin that has a relatively high relative dielectric constant. Each of the sheet-shaped electrodes 22 and 23 includes wiring lines that form a predetermined conductive path within the surface. The wiring lines of the electrode 22 and the wiring lines of the electrode 23 are, for example, opposed across the dielectric layer 21 in a grid pattern. The sheet-shaped surface pressure sensor 20 has sensitive positions capable of measuring a capacitance between the electrodes in a predetermined matrix pattern. For example, JP 2018-136241 A proposes a capacitive pressure sensor that is made of a flexible and electrically conductive rubber material. Such a flexible sheet-shaped capacitive pressure sensor may alleviate uncomfortableness even when it is fitted inside a seat of a vehicle.

When pressure is applied to a portion of the surface pressure sensor 20, the distance between the wiring line of the electrode 22 and the wiring line of the electrode 23 reduces at the portion where the pressure is applied. Thus, when the distance between the wiring line of the electrode 22 and the wiring line of the electrode 23 reduces, a change in capacitance occurs. The sheet-shaped surface pressure sensor 20 has sensitive positions capable of measuring a capacitance between the electrodes in a predetermined matrix pattern, and it can obtain a pressure distribution by measuring a capacitance at each of the sensitive positions. The sheet-shaped surface pressure sensor 20 is able to detect a change in pressure distribution by obtaining a pressure distribution change over time. The details of the structure of the surface pressure sensor 20 are disclosed in, for example, JP 2018-136241 A and JP 2018-169315 A. In addition, unless specifically stated otherwise, the surface pressure sensor 20 that may be used in the vehicle disclosed herein is not limited to a particular one. Therefore, the detailed description thereof is omitted herein.

The surface pressure sensors 20 are disposed respectively along the cushion surface 12a of the cushion portion 12, the backrest surface 14a of the seat back portion 14, and the outer peripheral surface of the arm rest portion 18. Each of the surface pressure sensors 20 may be configured to obtain the pressure distribution in a predetermined area within the surface on which it is disposed.

In this embodiment, the seat 10 is provided with surface pressure sensors 20 including a first surface pressure sensor 20a, a second surface pressure sensor 20b, and a third surface pressure sensor 20c.

First Surface Pressure Sensor 20a

The first surface pressure sensor 20a is disposed along the cushion surface 12a. In this embodiment, the first surface pressure sensor 20a is disposed in a predetermined area that can be in contact with the back of the thighs and the buttocks of the occupant when the occupant is seated on the cushion portion 12. Such a first surface pressure sensor 20a is able to obtain the distribution of pressure acting on the cushion surface 12a when the occupant is seated. It should be noted that, in order to cope with differences in physiques of occupants, the predetermined area, which can be in contact with the back of the thighs and the buttocks of the occupant when the occupant is seated on the cushion portion 12, may be set to be slightly wider than the area that is actually in contact with the back of the thighs and the buttocks of the occupant.

Second Surface Pressure Sensor 20b

The second surface pressure sensor 20b is disposed along the backrest surface 14a. In this embodiment, the second surface pressure sensor 20b is disposed in a predetermined area of the backrest surface 14a that can be in contact with the back of the shoulder blades and the surrounding region of the occupant when the occupant seated on the cushion portion 12 leans on the seat back portion 14. Such a second surface pressure sensor 20b is able to obtain the distribution of the pressure acting on the backrest surface 14a when the occupant is seated.

The second surface pressure sensor 20b may also cope with differences in physiques of occupants in this embodiment. For example, the second surface pressure sensor 20b may be disposed in such an area that can be in contact with the back of the shoulder blades and the surrounding region of the occupant when the occupant seated on the cushion portion 12 leans on the seat back portion 14. The area in which the second surface pressure sensor 20b is to be disposed may be set to be, for example, slightly wider than the area that makes contact with the back of the shoulder blades. Accordingly, the second surface pressure sensor 20b may include, for example, two surface pressure sensors 20 separately provided respectively on the left side and the right side of the backrest surface 14a. Also, the second surface pressure sensor 20b may be disposed above the middle of the height of the backrest surface 14a.

Third Surface Pressure Sensor 20c

The third surface pressure sensor 20c is disposed along the outer peripheral surface of the arm rest portion 18. The third surface pressure sensor 20c is disposed in a predetermined area of the outer peripheral surface of the arm rest portion 18 that can be pressed by a hand, an arm, or an elbow of the occupant seated on the cushion portion 12. In this embodiment, the third surface pressure sensor 20c is disposed so as to cover part of the outer peripheral surface of the arm rest portion 18, including the upper surface, the inner side surface, the fore-end portion, and a region surrounding the fore-end portion of the arm rest portion 18. In this case as well, the area in which the third surface pressure sensor 20c is to be disposed may be set to cope with differences in physiques of occupants. For example, the area in which the third surface pressure sensor 20c is to be disposed may be set to be slightly wider than a portion of the arm rest portion 18 that can be pressed by a hand, an arm, or an elbow of the occupant when the occupant is seated on the cushion portion 12. The third surface pressure sensor 20c may be disposed on at least one of the upper surface, the inner side surface, and the fore-end portion of the entire outer peripheral surface of the arm rest portion 18.

In the example shown in FIG. 1, each of the first surface pressure sensor 20a, the second surface pressure sensor 20b, and the third surface pressure sensor 20c is composed of a single sheet-shaped surface pressure sensor. The first surface pressure sensor 20a, the second surface pressure sensor 20b, and the third surface pressure sensor 20c are not limited to the just-mentioned configuration. Each of the first surface pressure sensor 20a, the second surface pressure sensor 20b, and the third surface pressure sensor 20c may be composed of a plurality of sheets of sheet-shaped surface pressure sensors each of which is disposed to fill a predetermined area. Each of the surface pressure sensors 20 may be fitted to an inside of the upholstery surface of the seat 10. When a capacitive pressure sensor is employed, the surface pressure sensors 20 may be covered in an appropriate manner by, for example, an electromagnet shielding sheet, in order to prevent erroneous detection.

Although the capacitive pressure sensor is shown as an example of the surface pressure sensor 20, the surface pressure sensor 20 is not limited to the capacitive pressure sensor unless specifically stated otherwise. For the surface pressure sensor 20, it is also possible to employ various types of sensors, such as piezoelectric surface pressure sensors and electrical resistive sensors, other than the capacitive pressure sensor.

Moreover, although the example shown in FIG. 1 shows that the arm rest portion 18 is provided only on the left side of the seat back portion 14, it is also possible that the arm rest portion 18 may be provided on the right side of the seat back portion 14. Furthermore, arm rest portions 18 may be provided respectively on the left and right sides of the seat back portion 14. When the arm rest portions 18 are respectively provided respectively on the left and right sides of the seat back portion 14, third surface pressure sensors 20c may be provided respectively on the left and right arm rest portions 18. Although the capacitive pressure sensor is shown as an example herein, the surface pressure sensor 20 is not limited to the capacitive pressure sensor unless specifically stated otherwise.

Base 30

Figure 3:
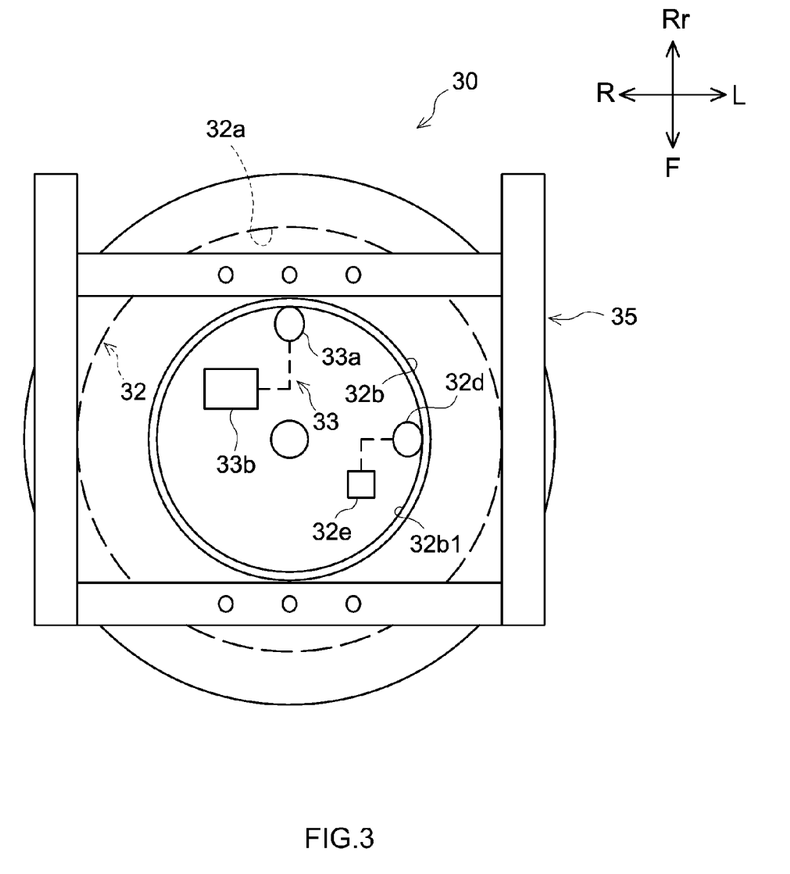
FIG. 3 is a plan view schematically illustrating a base 30.
Figure 4:
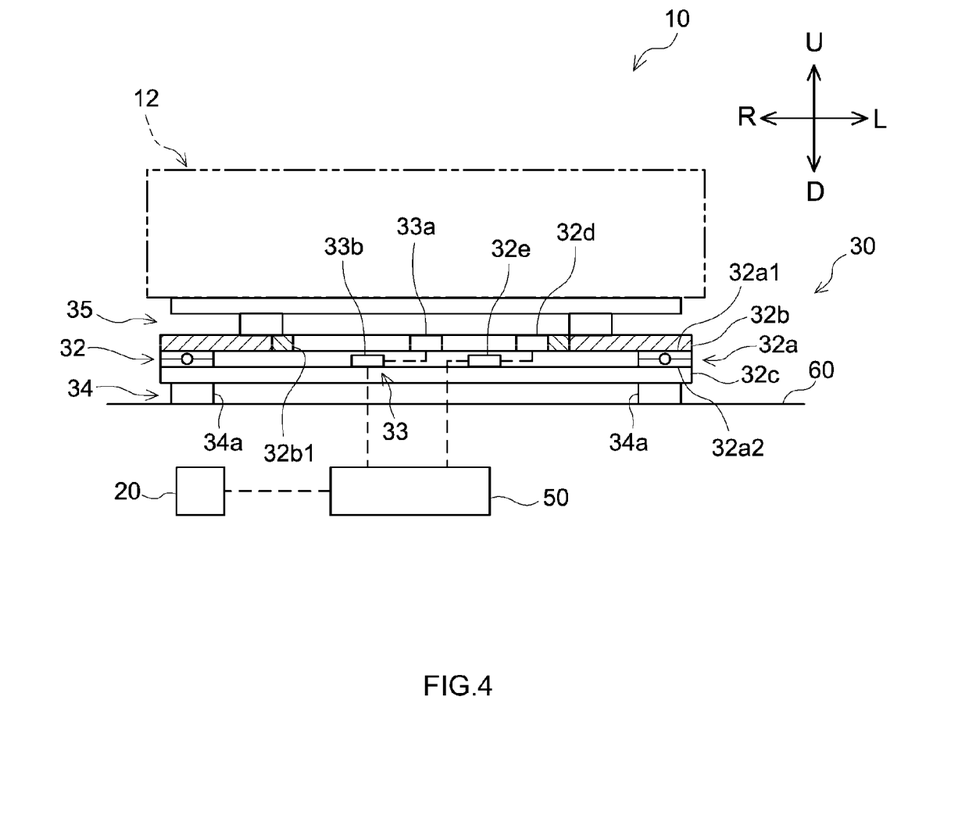
FIG. 4 is a cross-sectional view schematically illustrating the base 30.

The base 30 is fitted to the floor of the vehicle. The seat 10 (see FIG. 1) is mounted to the base 30. FIG. 3 is a plan view schematically illustrating the base 30. FIG. 4 is a cross-sectional view schematically illustrating the base 30.

As illustrated in FIGS. 3 and 4, the base 30 includes the swivel 32, the lock mechanism 33, a slide mechanism 34 (see FIGS. 1 and 4), and a frame 35.

Swivel 32

As illustrated in FIG. 4, the swivel 32 includes a thrust bearing 32a, an upper plate 32b, and a lower plate 32c. The thrust bearing 32a is a bearing that bears the load that acts in the direction of the rotation axis (i.e., the axial load). In this embodiment, the thrust bearing 32a has an outer diameter that approximately corresponds to the outer diameter of the swivel 32. Also, a thin, disk-shaped thrust bearing is adopted for the thrust bearing 32a.

Although not shown in the drawings, the thrust bearing 32a includes a first housing, a second housing, a plurality of rolling elements, and a retainer. Here, the first housing and the second housing are vertically opposed to each other. The plurality of rolling elements are disposed between the first housing and the second housing so as to be circumferentially spaced at predetermined gaps. The retainer is disposed between the first housing and the second housing so as to retain the gaps between the plurality of rolling elements. For the thrust bearing 32a, it is possible to adopt a thrust bearing that has appropriate specifications, such as appropriate size and rigidity, among the thrust bearings commercially available from bearing manufacturers. The upper plate 32b is fitted to a first housing 32a1 of the thrust bearing 32a. The lower plate 32c is fitted to a second housing 32a2 of the thrust bearing 32a.

Here, the upper plate 32b is a doughnut-shaped disk having a hole at its center. The inner side edge of the upper plate 32b is provided with an internally toothed sun gear 32b1. In this embodiment, the swivel 32 includes a speed measurement gear 32d that is disposed at a fixed position inside the upper plate 32b and meshes with the internally toothed sun gear 32b1, as illustrated in FIG. 3. The speed measurement gear 32d is attached to an encoder 32e. The speed measurement gear 32d rotates while meshing with the internally toothed sun gear 32b1. The encoder 32e measures the rotational speed of the speed measurement gear 32d to measure the swivel speed of the swivel 32. The encoder 32e is thus able to measure the swivel speed of the cushion portion 12, in other words, the swivel speed of the seat 10.

Although not shown in the drawings, the swivel 32 may include a stopper that limits the range in which the cushion portion 12 can swivel in circumferential directions, when appropriate. Here, as illustrated in FIG. 4, the speed measurement gear 32d and the encoder 32e may be fitted to the lower plate 32c of the swivel 32. The encoder 32e may be connected to the controller 50. The measurement unit 50d that measures the swivel speed of the seat 10 may be embodied by such an encoder 32e.

Lock Mechanism 33

The lock mechanism 33 includes a lock gear 33a and an actuator 33b. Herein, the lock gear 33a is a rotationally stationary gear. As illustrated in FIG. 4, when meshed with the internally toothed sun gear 32b1 of the upper plate 32b, the lock gear 33a stops rotation of the upper plate 32b. Although not shown in the drawings, the lock gear 33a may be pressed against the internally toothed sun gear 32b1 by, for example, a spring (not shown). The actuator 33b is a drive that moves the lock gear 33a so as to be disengaged from the internally toothed sun gear 32b1. The actuator 33b incorporates, for example, a servomotor that is controlled by the controller 50. In this embodiment, the actuator 33b is controlled by the controller 50 to thereby cause the lock gear 33a that is pressed against the internally toothed sun gear 32b1 by the spring to be disengaged from the internally toothed sun gear 32b1 when appropriate.

Thus, locking and unlocking of the swivel 32 by the lock mechanism 33 is controlled by the controller 50. Here, the actuator 33b may be fitted to the lower plate 32c of the swivel 32. The actuator 33b may also be connected to the controller 50. The above-described embodiment illustrates, as an example, that the lock gear 33a is pressed against the internally toothed sun gear 32b1 by a spring at the time of locking and the actuator 33b is activated at the time of unlocking. The lock mechanism 33 is not limited to such an embodiment. For example, it is also possible that the elastic reaction force of the spring may be applied to the lock gear 33a so as to cause the lock gear 33a to be disengaged from the internally toothed sun gear 32b1, and at the time of locking, the lock gear 33a may be pressed against the internally toothed sun gear 32b1 by the action of the actuator 33b. In this case, at the time of unlocking, the actuator 33b is deactivated so that the lock gear 33a can be disengaged from the internally toothed sun gear 32b1 by the elastic reaction force of the spring.

Slide Mechanism 34 and Frame 35

The slide mechanism 34 is mounted on a cabin floor 60 of the vehicle. In this embodiment, the lower plate 32c of the swivel 32 is mounted on the slide mechanism 34, and slide rails 34a are disposed along a front-to-rear direction of the vehicle. A frame 35 is mounted on the upper plate 32b of the swivel 32. As illustrated in FIG. 3, the frame 35 has a substantially rectangular parallelepiped shape in which frame members are assembled in a rectangular shape. As illustrated in FIG. 4, the frame 35 is secured to the upper plate 32b of the swivel 32. Further, the lower surface of the cushion portion 12 of the seat 10 is placed over and secured to the frame 35. In this way, the seat 10 is mounted via the slide mechanism 34 and the swivel 32 to the cabin floor 60 of the vehicle.

Controller 50

As illustrated in FIG. 4, the controller 50 is configured to cause the lock mechanism 33 to switch the swivel 32 between a locked state and an unlocked state based on a change in pressure distribution that is detected by the surface pressure sensors 20. In this embodiment, the surface pressure sensors 20 include a first surface pressure sensor 20a, which is fitted to the cushion portion 12, a second surface pressure sensor 20b, which is fitted to the seat back portion 14, and a third surface pressure sensor 20c, which is fitted to the arm rest portion 18. The controller 50 obtains a change in pressure distribution that is detected by the first surface pressure sensor 20a, a change in pressure distribution that is detected by the second surface pressure sensor 20b, and a change in pressure distribution or a surface pressure that is detected by the third surface pressure sensor 20c. Thus, the controller 50 may be configured to cause the lock mechanism 33 to be unlocked to switch the swivel 32 between the locked state and the unlocked state based on the change in pressure distribution that is detected by the first surface pressure sensor 20a, on the change in pressure distribution that is detected by the second surface pressure sensor 20b, and on the change in pressure distribution or the surface pressure that is detected by the third surface pressure sensor 20c.

The controller 50 includes an acquisition unit 50a, a determination unit 50b, an execution unit 50c, and a measurement unit 50d.

Herein, the acquisition unit 50a is a processing unit that obtains the pressure distribution detected by the surface pressure sensor 20. In this embodiment, pressure distributions detected by the first surface pressure sensor 20a, the second surface pressure sensor 20b, and the third surface pressure sensor 20c are obtained from the respective surface pressure sensors 20.

The determination unit 50b is a processing unit that determines whether or not the swivel 32 is to be unlocked.

The execution unit 50c executes a process of unlocking the swivel 32 by the lock mechanism 33 if the determination unit 50b determines that the swivel 32 is to be unlocked. Further in this embodiment, the execution unit 50c executes a process of locking the swivel 32 again after the swivel 32 is unlocked. That is, the execution unit 50c controls the actuator 33b so as to cause the lock mechanism 33 to switch the swivel 32 between the locked state and the unlocked state.

The measurement unit 50d is a processing unit that measures the swivel speed of the seat 10.

Controller 50

Figure 5:
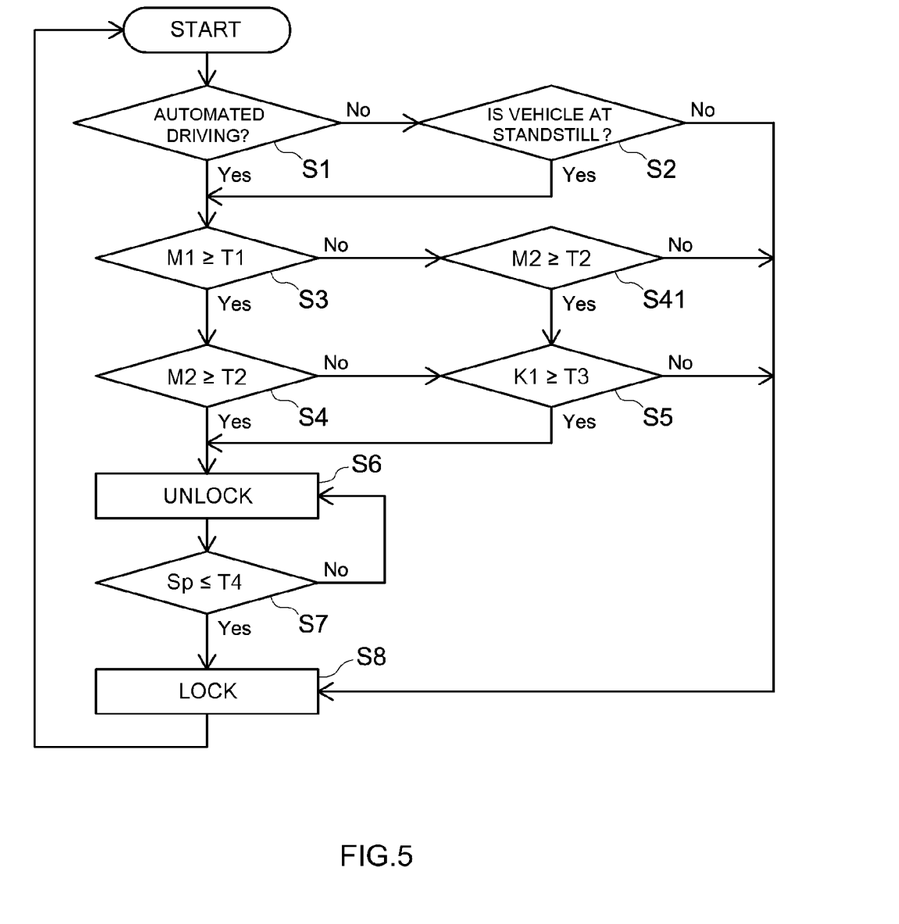
FIG. 5 is a flowchart illustrating a process flow of a controller 50.

FIG. 5 is a flowchart illustrating a process flow of the controller 50.

In this embodiment, the vehicle is equipped with, for example, a level 4 or higher automated driving technology according to SAE J3016 specified by SAE international. Level 4 achieves a high level of automated driving in which the system carries out all the driving tasks under special conditions.

The controller 50 shown in FIG. 5 determines whether or not the vehicle is controlled by the above-mentioned level 4 or higher automated driving (S1). Here, if the vehicle is not controlled by the level 4 or higher automated driving (No), it is determined whether or not the vehicle is at standstill (S2). Then, if the vehicle is not at standstill (No), the swivel 32 is maintained in a locked state.

In addition, if the determination in S1 indicates that the vehicle is controlled by the level 4 or higher automated driving (Yes) and if the determination in S2 indicates that the vehicle is at standstill (Yes), it is further determined whether or not the lock mechanism 33 is to be unlocked to permit the seat 10 to swivel. The conditions that the vehicle is at standstill include, for example, the case where the transmission shift selector is in the Park position, the case where the engine is not running, and the case where the drive switch of an electric vehicle is off.

This seat 10 is configured to unlock the swivel 32 according to a natural action carried out by the occupant seated on the seat 10 intending to swivel the seat 10. Then, the controller 50 may be configured to detect the natural action carried out by the occupant seated on the seat 10 intending to swivel the seat 10 based on a change in pressure distribution detected by the surface pressure sensors 20, so as to cause the lock mechanism 33 to be unlocked at appropriate timing. Furthermore, the controller 50 may be configured to lock the swiveling of the seat 10 again at appropriate timing after the swiveling of the seat 10 has completed.

In this embodiment, if the occupant seated on the seat 10 wishes to swivel the seat 10 leftward, for example, the swivel 32 is unlocked when the occupant takes an action such as to shift the body weight to the left side or to the rear-left side of the seat 10 by pushing the floor with the occupant's right foot. With the action such as to shift the body weight to the left side or to the rear-left side of the seat 10 by pushing the floor with the occupant's right foot, the center of gravity of the occupant seated on the seat 10 is shifted toward the left side of the cushion surface 12a. In addition, when the arm rest portion 18, disposed on the left, is pulled down, the body weight of the occupant may be shifted on the arm rest portion 18. When the arm rest portion 18 is not pulled down, the body weight may be shifted onto the seat back portion 14 toward the rear-left side, for example.

Shift Amount of Center of Gravity Acting on the Cushion Surface 12a

In the embodiment described above, the first surface pressure sensor 20a is disposed along the cushion surface 12a. Also, the second surface pressure sensor 20b is disposed along the backrest surface 14a. Furthermore, the third surface pressure sensor 20c is disposed along the outer peripheral surface of the arm rest portion 18. In this case, it is possible to obtain the shift amount of the center of gravity acting on the cushion surface 12a based on a change in pressure distribution detected by the first surface pressure sensor 20a. Here, various techniques have been proposed to detect the center of gravity acting on the cushion surface 12a from the pressure distribution that is detected by the first surface pressure sensor 20a, and any of the known techniques may be employed as appropriate. By using pre-programmed software, the center of gravity acting on the cushion surface 12a can be obtained from the pressure distribution that is detected by the first surface pressure sensor 20a. Then, the shift amount of the center of gravity can be obtained from a change over time of the pressure distribution that has been detected by the first surface pressure sensor 20a.

Figure 6:
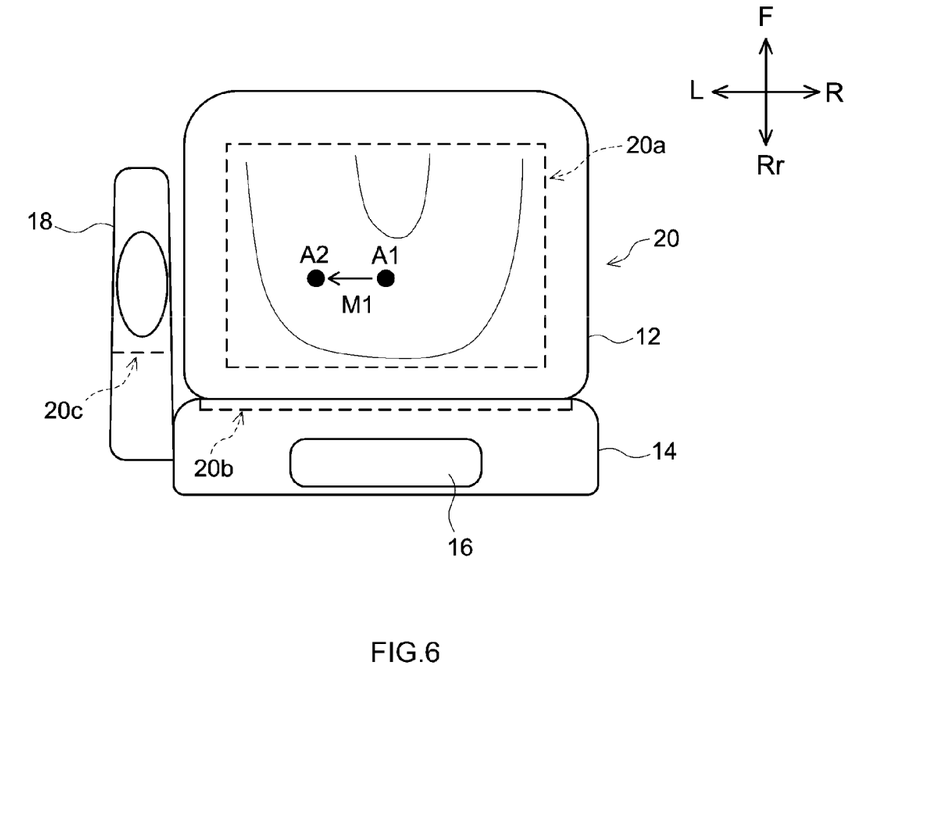
FIG. 6 is a plan view schematically illustrating the seat 10.

Here, FIG. 6 is a plan view schematically illustrating the seat 10. As illustrated in FIG. 6, for example, the center-of-gravity reference position A1 is obtained based on the pressure distribution detected by the first surface pressure sensor 20a. When the occupant seated on the seat 10 wishes to swivel the seat 10 leftward, the occupant takes an action such as to shift the body weight to the left side or to the rear-left side of the seat 10 by pushing the floor with the occupant's right foot. Accordingly, the center of gravity acting on the cushion surface 12a shifts toward the left. At this time, the shifted center-of-gravity position A2 is obtained based on the pressure distribution detected by the first surface pressure sensor 20a. Then, the distance from the center-of-gravity reference position A1 to the shifted center-of-gravity position A2 may be obtained as a shift amount M1 of the center of gravity. The controller 50 may include a processing module configured to obtain the shift amount M1 of the center of gravity acting on the cushion surface 12a based on a change in pressure distribution that is detected by the first surface pressure sensor 20a.

Displacement of the Center of the Load Acting on Backrest Surface 14a

In a similar manner, the shift amount of the center of load acting on the backrest surface 14a can be obtained based on a change in pressure distribution that is detected by the second surface pressure sensor 20b. For example, as illustrated in FIG. 1, the reference position B1 of the center of the load acting on the backrest surface 14a is obtained based on the pressure distribution detected by the second surface pressure sensor 20b. When the occupant seated on the seat 10 wishes to swivel the seat 10 leftward, the occupant takes an action such as to shift the body weight to the left side or to the rear-left side of the seat 10 by pushing the floor with the occupant's right foot. When the action such as to shift the body weight to the rear-left side of the seat 10 is taken by, for example, pushing the floor with the occupant's right foot and directing the occupant's upper body leftward, the seat back portion 14 is pressed by, for example, the back of the left shoulder blade of the occupant. Such an action causes the center of the load acting on the backrest surface 14a to shift leftward.

At this time, the shifted position B2 of the center of the load acting on the backrest surface 14a is obtained based on the pressure distribution detected by the second surface pressure sensor 20b. Then, the distance from the reference position B1 to the shifted position B2 may be obtained as a shift amount M2 of the center of the load acting on the backrest surface 14a. The controller 50 may also include, for example, a processing module configured to obtain the shift amount M2 of the center of the load acting on the backrest surface 14a based on a change in pressure distribution that is detected by the second surface pressure sensor 20b. Here, various techniques have been proposed that may be used for detecting the center of the load acting on the backrest surface 14a from the pressure distribution detected by the second surface pressure sensor 20b, and any of the known techniques may be employed as appropriate. Then, by using pre-programmed software, the center of the load acting on the backrest surface 14a can be obtained from the pressure distribution detected by the second surface pressure sensor 20b. Also, the shift amount of the center of the load acting on the backrest surface 14a can be obtained from the change over time of the pressure distribution that has been detected by the second surface pressure sensor 20b.

Load Acting on Arm Rest Portion 18

The load acting on the arm rest portion 18 can be obtained based on a change in pressure distribution or a surface pressure that is detected by the third surface pressure sensor 20c. For example, when the occupant seated on the seat 10 wishes to swivel the seat 10 leftward, the occupant may shift the body weight onto the arm rest portion 18 on the left side as a natural action while taking the action such as to shift the body weight to the left side or to the rear-left side of the seat 10 by pushing the floor with the occupant's right foot. In such a case, the load acting on the arm rest portion 18 increases. The load K1 acting on the arm rest portion 18 can be obtained based on the change in pressure distribution or the surface pressure that is detected by the third surface pressure sensor 20c. For example, the load K1 acting on the arm rest portion 18 may be obtained by integrating the surface pressure per a predetermined area based on the pressure distribution that has been detected by the third surface pressure sensor 20*c*. The controller 50 may also include, for example, a processing module configured to obtain the load K1 acting on the arm rest portion 18 based on the change in pressure distribution or the surface pressure that is detected by the third surface pressure sensor 20*c*.

In this embodiment, it is determined whether or not a shift of the center of gravity has occurred (S3), as illustrated in FIG. 5. In the determination at S3, it is determined whether or not the shift amount M1 of the center of gravity acting on the cushion surface 12*a* is greater than or equal to a predetermined threshold value T1 (M1≥T1), for example, based on a change in pressure distribution in the first surface pressure sensor 20*a*.

Next, if the determination in S3 indicates that the shift amount M1 of the center of gravity is greater than or equal to a predetermined threshold value T1 (i.e., M1≥T1) (Yes), then it is determined whether or not the shift amount M2 of the center of the load acting on the backrest surface 14*a* is greater than or equal to a predetermined threshold value T2 (i.e., M2≥T2) (S4).

Then, if the determination in S3 indicates that the shift amount M1 of the center of gravity is greater than or equal to a predetermined threshold value T1 (i.e., M1≥T1) (Yes) and also the determination in S4 indicates that the shift amount M2 of the center of the load acting on the backrest surface 14*a* is greater than or equal to a predetermined threshold value T2 (i.e., M2≥T2) (Yes), the swivel 32 is unlocked (S6).

For example, when the occupant seated on the seat 10 wishes to swivel the seat 10 leftward, the occupant takes an action such as to shift the body weight to the left side or to the rear-left side of the seat 10 by pushing the floor with the occupant's right foot. The reaction force at this time causes the center of gravity of the occupant to shift leftward within the cushion surface 12*a*. The shift of the center of gravity appears in a change in pressure distribution that is detected by the first surface pressure sensor 20*a*. It is determined whether or not the shift amount M2 of the center of the load acting on the backrest surface 14*a* is greater than the predetermined threshold value T2. Then, when the center of gravity of the occupant shifts leftward significantly and the center of the load acting on the backrest surface 14*a* shifts significantly, the swivel 32 is unlocked.

In this embodiment, if the determination in S4 indicates that the shift amount M2 of the center of the load acting on the backrest surface 14*a* is not greater than or equal to the predetermined threshold value T2 (i.e., not M2≥T2) (No), it is further determined whether or not the change of the load K1 on the arm rest portion 18 is greater than or equal to a predetermined threshold value T3 (K1≥T3) based on the surface pressure or the change in the pressure distribution obtained by the third surface pressure sensor 20*c* (S5). Then, if the determination in S5 indicates that the load K1 acting on the arm rest portion 18 is greater than or equal to the predetermined threshold value T3 (Yes), the process of unlocking the swivel 32 is executed (S6).

For example, when the occupant seated on the seat 10 wishes to swivel the seat 10 leftward, the occupant takes an action such as to shift the body weight to the left side or to the rear-left side of the seat 10 by pushing the floor with the occupant's right foot. If the arm rest portion 18 is down, this may prompt the occupant to make a movement such as to press the arm rest portion 18. When this is the case, it is possible that the body of the occupant may be off the backrest surface 14*a*. In the determination at S5 herein, it is possible to detect such an action as to shift the body weight to the left side or to the rear-left side of the seat 10 by pushing the floor with the occupant's right foot while pushing the arm rest portion 18 leftward. That is, the swivel 32 is unlocked when the center of gravity of the occupant shifts leftward significantly and also the arm rest portion 18 is pushed strongly.

In this way, if the determination in S3 indicates that the shift amount M1 of the center of gravity is greater than or equal to a predetermined threshold value T1 (i.e., M1≥T1) (Yes) and also the determination in S5 indicates that the load K1 on the arm rest portion 18 is greater than or equal to a predetermined threshold value T3 (Yes), the swivel 32 is unlocked (S6). In this embodiment, if the determination in S5 indicates that the load K1 on the arm rest portion 18 is not greater than or equal to the predetermined threshold value T3 (No), the swivel 32 is maintained to be locked (S8).

Also, if the determination in S3 indicates that the shift amount M1 of the center of gravity is not greater than or equal to a predetermined threshold value T1 (No), it is further determined whether or not the shift amount M2 of the center of the load acting on the backrest surface 14*a* is greater than or equal to a predetermined threshold value T2 (i.e., M2≥T2) (S41). If the determination in S41 indicates that the shift amount M2 of the center of the load acting on the backrest surface 14*a* is not greater than the predetermined threshold value T2 (No), the swivel 32 is maintained to be locked (S8).

On the other hand, if the determination in S41 indicates that the shift amount M2 of the center of the load acting on the backrest surface 14*a* is greater than or equal to the predetermined threshold value T2 (Yes), it is determined whether or not the change of the load K1 acting on the arm rest portion 18 is greater than or equal to a predetermined threshold value T3 (K1≥T3) (S5). Then, if the determination in S5 indicates that the load K1 acting on the arm rest portion 18 is greater than or equal to the predetermined threshold value T3 (Yes), the process of unlocking the swivel 32 is executed (S6).

For example, when the occupant seated on the seat 10 wishes to swivel the seat 10 leftward, the occupant takes an action such as to shift the body weight to the left side or to the rear-left side of the seat 10 by pushing the floor with the occupant's right foot. If the arm rest portion 18 is down, this may prompt the occupant to make a movement such as to press the arm rest portion 18. When this situation arises, it is possible that the shift of the center of gravity of the occupant may not be detected properly with the cushion surface 12*a*. Even if the shift of the center of gravity of the occupant is not detected properly with the cushion surface 12*a*, the determination at S5 herein makes it possible to detect such an action as to shift the body weight to the left side or to the rear-left side of the seat 10, for example, by pushing the floor with the occupant's right foot while pushing the arm rest portion 18 leftward, so that the swivel 32 can be unlocked (S6).

Thus, if the determination in S41 indicates that the shift amount M2 of the center of the load acting on the backrest surface 14*a* is greater than or equal to a predetermined threshold value T2 (Yes) and also the determination at S5 indicates that the load K1 acting on the arm rest portion 18 is greater than or equal to a predetermined threshold value T3 (Yes), the swivel 32 is unlocked (S6). If the determination in S5 indicates that the load K1 on the arm rest portion 18 is not greater than or equal to the predetermined threshold value T3 (No), the swivel 32 is maintained to be locked (S8).

Thus, in this embodiment, the swivel 32 is unlocked (S6) if two of the following conditions are satisfied: the shift amount M1 of the center of gravity is greater than or equal to a predetermined threshold value T1 (i.e., M1≥T1); the shift amount M2 of the center of the load acting on the backrest surface 14a is greater than or equal to a predetermined threshold value T2 (i.e., M2≥T2); and the change of the load K1 acting on the arm rest portion 18 is greater than or equal to a predetermined threshold value T3 (K1≥T3).

Because two of the conditions need to be satisfied to unlock the swivel 32, it is possible to prevent unlocking in such cases where, for example, the occupant merely loses his/her posture without the intention to swivel the seat and the shift of the center of gravity occurs consequently. Moreover, when only the arm rest portion 18 is pushed firmly, or when only the backrest surface 14a is pushed firmly, the swivel 32 remains to be locked. In this way, it is possible to prevent erroneous determinations based on the occupant's actions without the occupant's intention to swivel the seat.

Pre-Trained Neural Network Model

In addition, the controller 50 (see FIG. 1) may include a pre-trained neural network model in place of the determinations using the threshold values as discussed above. Herein, the pre-trained neural network model may have learned training data that store associations between changes in pressure distribution detected by the first surface pressure sensor 20a, changes in pressure distribution detected by the second surface pressure sensor 20b, changes in pressure distribution or surface pressures detected by the third surface pressure sensor 20c, and conditions to unlock the lock mechanism 33.

The controller 50 may be configured to determine whether or not the lock mechanism 33 is to be unlocked by inputting a change in pressure distribution that is detected by the first surface pressure sensor 20a, a change in pressure distribution that is detected by the second surface pressure sensor 20b, and a change in pressure distribution or a surface pressure that is detected by the third surface pressure sensor 20c into such a pre-trained neural network model. The pre-trained neural network model may be incorporated, for example, in the determination unit 50b of the controller 50. The pre-trained neural network model enables the setting of threshold values, which requires complicated and troublesome work, to be replaced by machine learning. Moreover, the timing for unlocking the lock mechanism 33 is optimized by machine learning.

Unlocking

In the process of unlocking in this embodiment, the lock gear 33a of the lock mechanism 33 is disengaged from the internally toothed sun gear 32b1 of the upper plate 32b, as illustrated in FIGS. 3 and 4. This allows the upper plate 32b to swivel freely with the thrust bearing 32a. By performing such a process, the seat 10 starts to swivel at a speed desired by the occupant. The occupant may stop swiveling at an appropriate position with his/her feet touching the floor. In this case, the swivel speed Sp of the seat 10 is detected by an encoder 32e attached to the speed measurement gear 32d, and it is determined at S7 whether or not the swivel speed of the seat 10 has reduced.

As illustrated in FIG. 5, it may be determined at S7 that the swivel speed Sp of the seat 10 has become less than or equal to a predetermined threshold value T4 (i.e., Sp≤T4) based on the swivel speed Sp of the seat 10 that is detected by the encoder 32e. Then, when the determination at S7 indicates that the swivel speed of seat 10 has reduced, the swiveling of the seat 10 may be locked (S8). This enables the seat 10 to be locked with the condition that the swiveling is stopped at a position desired by the occupant. Although it has been described as an example that it is determined at S7 that the swivel speed Sp of the seat 10 has become less than or equal to a predetermined threshold value T4, this example is merely illustrative. For example, in the determination at S7, it is possible to detect that the seat 10 has stopped (Sp=0) based on the swivel speed Sp of the seat 10 detected by the encoder 32e, so that the swiveling of the seat 10 can be locked.

Next, when the occupant intends to swivel the seat 10 rightward, the arm rest portion 18 is not provided on the right side of the seat 10 in this embodiment (see FIG. 1). Accordingly, the occupant may place the body weight on the rear-right side of the seat 10 by, for example, pressing the occupant's left foot downward and directing the occupant's upper body rightward with the occupant seated on the seat 10. When such an action is taken, the center of gravity of the occupant shifts rightward within the cushion portion 12. In addition, the seat back portion 14 is pressed rearward by, for example, the back of the right shoulder blade.

Such an action can be detected by a change in pressure distribution in the first surface pressure sensor 20a fitted along the cushion surface 12a and a change in pressure distribution in the second surface pressure sensor 20b fitted along the backrest surface 14a. Referring to the flowchart shown in FIG. 5, the intention of the occupant to swivel the seat 10 rightward is detected by the detection of the shift of the center of gravity in the determination at S3 and a change in the pressure distribution in the backrest surface 14a in the determination at S4, so that the swivel 32 is unlocked by the lock mechanism 33 (S6).

As described thus far, the vehicle proposed herein allows the swivel 32 to be unlocked according to an occupant's natural action intending to swivel the seat 10. Specifically, the controller 50 detects a natural action carried out by the occupant seated on the seat 10 intending to swivel the seat 10 based on a change in pressure distribution that is detected by the surface pressure sensors 20 fitted to the seat 10. Then, the controller 50 permits the lock mechanism 33 to be unlocked at appropriate timing. Furthermore, the controller 50 is configured to lock the swiveling of the seat 10 again at appropriate timing after the swiveling of the seat 10 has completed. This eliminates the need for additionally providing manual operation parts, such as switches and levers, to enable the seat 10 to swivel, separately from the seat 10. As a result, the seat 10 may be provided with desirable operability in swiveling.

From the viewpoint that the manual operation parts such as switches and levers that enable the seat 10 to swivel need not be provided separately from the seat 10, it is possible to provide a plurality of surface pressure sensors 20 each disposed along an outer surface of the seat 10 to obtain a pressure distribution within a predetermined area of the surface where a corresponding one of the pressure sensors 20 is disposed. The controller 50 may be configured to cause the lock mechanism 33 to be unlocked based on a change in pressure distribution or a surface pressure that is detected by any of the surface pressure sensors 20. In other words, each of the surface pressure sensors 20 disposed along an outer surface of the seat 10 may be used as a switching sensor to unlock the swivel 32.

As described above, embodiments of the vehicle illustrated herein have been described. However, the vehicle illustrated herein is not limited to these embodiments.

In the foregoing embodiments, the seat 10 includes the cushion portion 12, the seat back portion 14, and the arm rest portion 18. The seat 10 also includes the first surface pressure sensor 20a, which is disposed along the cushion surface 12a of the cushion portion 12, the second surface pressure sensor 20b, which is disposed along the backrest surface 14a of the seat back portion 14, and the third surface pressure sensor 20c, which is disposed along the outer peripheral surface of the arm rest portion 18. The locations at which the surface pressure sensors 20 are attached to the seat 10 are, however, not limited to such an embodiment.

For example, the seat 10 may not be provided with the arm rest portion 18. When this is the case, the seat 10 may be provided with the first surface pressure sensor 20a disposed along the cushion surface 12a of the cushion portion 12 and the second surface pressure sensor 20b disposed along the backrest surface 14a of the seat back portion 14. In this case, the lock mechanism 33 may be unlocked based on a change in pressure distribution that is detected by the first surface pressure sensor 20a and on a change in pressure distribution that is detected by the second surface pressure sensor 20b. It is also possible that the lock mechanism 33 may be unlocked in the same manner even when the arm rest portion 18 is provided.

In this case, for example, the controller 50 may be configured to execute a process of obtaining the shift amount M1 of the center of gravity acting on the cushion surface 12a and a process of obtaining the shift amount M2 of the center of the load acting on the backrest surface 14a. In this case, the controller 50 may be configured to execute a process of unlocking the lock mechanism 33 if the obtained shift amount M1 of the center of gravity is greater than a predetermined threshold value and also the obtained shift amount M2 of the center of the load is greater than a predetermined threshold value.

Moreover, the controller 50 may also include a pre-trained neural network model, for example. Here, the pre-trained neural network model may have learned training data that store associations between changes in pressure distribution detected by the first surface pressure sensor 20a, changes in pressure distribution detected by the second surface pressure sensor 20b, and conditions to unlock the lock mechanism 33. The controller 50 may be configured to determine whether or not the lock mechanism 33 is to be unlocked by inputting a change in pressure distribution detected by the first surface pressure sensor 20a and a change in pressure distribution detected by the second surface pressure sensor 20b into the pre-trained neural network model. The pre-trained neural network model may be incorporated, for example, in the determination unit 50b of the controller 50.

When the arm rest portion 18 is provided, the controller 50 may be configured to cause the lock mechanism 33 to be unlocked based on a change in pressure distribution that is detected by the first surface pressure sensor 20a and on a change in pressure distribution or the surface pressure that is detected by the third surface pressure sensor 20c. This allows the lock mechanism 33 to be unlocked based on a change in pressure distribution acting on the cushion surface 12a and on a change in pressure distribution or the surface pressure acting on the arm rest portion 18. Thus, each of the cushion surface 12a and the outer peripheral surface of the arm rest portion 18 may be provided with a surface pressure sensor 20, while the backrest surface 14a may not be provided with a surface pressure sensor 20.

For example, the controller 50 may be configured to execute a process of obtaining the shift amount M1 of the center of gravity acting on the cushion surface 12a and a process of obtaining the load K1 acting on the arm rest portion 18, as described above. The controller 50 may also be configured to execute a process of unlocking the lock mechanism 33 if the shift amount M1 of the center of gravity is greater than the predetermined threshold value T1 and also the load K1 is greater than the predetermined threshold value T3.

Moreover, the controller 50 may also include a pre-trained neural network model, for example. Here, the pre-trained neural network model may have learned training data that store associations between changes in pressure distribution detected by the first surface pressure sensor 20a, changes in pressure distribution or surface pressures detected by the third surface pressure sensor 20c, and conditions to unlock the lock mechanism 33. The controller 50 may be configured to determine whether or not the lock mechanism 33 is to be unlocked by inputting a change in pressure distribution detected by the first surface pressure sensor 20a and a change in pressure distribution or the surface pressure detected by the third surface pressure sensor 20c into the pre-trained neural network model. The pre-trained neural network model may be incorporated, for example, in the determination unit 50b of the controller 50.

Furthermore, the controller 50 may be configured to cause the lock mechanism 33 to be unlocked based on a change in pressure distribution detected by the second surface pressure sensor 20b and on a change in pressure distribution or the surface pressure by the third surface pressure sensor 20c. This allows the lock mechanism 33 to be unlocked based on a change in pressure distribution acting on backrest surface 14a and on a change in pressure distribution or the surface pressure acting on the arm rest portion 18. In this case, the cushion surface 12a may not be provided with a surface pressure sensor 20.

For example, the controller 50 may be configured to execute a process of obtaining the shift amount M2 of the center of the load acting on the backrest surface 14a and a process of obtaining the load K1 acting on the arm rest portion 18, as described above. The controller 50 may also be configured to execute a process of unlocking the lock mechanism 33 if the shift amount M2 of the center of the load is greater than the predetermined threshold value T2 and also the load K1 is greater than the predetermined threshold value T3.

Moreover, the controller 50 may also include a pre-trained neural network model, for example. Here, the pre-trained neural network model may have learned training data that store associations between changes in pressure distribution detected by the second surface pressure sensor 20b, changes in pressure distribution or surface pressures detected by the third surface pressure sensor 20c, and conditions to unlock the lock mechanism 33. The controller 50 may be configured to determine whether or not the lock mechanism 33 is to be unlocked by inputting a change in pressure distribution detected by the second surface pressure sensor 20b and a change in pressure distribution or a surface pressure detected by the third surface pressure sensor 20c into the pre-trained neural network model. The pre-trained neural network model may be incorporated, for example, in the determination unit 50b of the controller 50.

Note that, in a situation where the occupant is not seated on the seat 10, it is troublesome to apply a predetermined load onto the seat 10 in order to unlock the lock mechanism 33. For this reason, the lock mechanism 33 is unlocked in a situation where the occupant is not seated on the seat 10 when the vehicle is at standstill. Alternatively, it is possible to provide an appropriate control operation, such as causing the seat 10 to be locked only at a predetermined seat position. Furthermore, the mechanical structures of the swivel 32 and the lock mechanism 33, for example, are not limited to those illustrated herein.

Various embodiments of the vehicle have been described hereinabove according the present disclosure. Unless specifically stated otherwise, the embodiments of the vehicle described herein do not limit the scope of the present invention.

What is claimed is:

1. A vehicle comprising:
a swivel;
a lock mechanism locking and unlocking the swivel to switch the swivel between a locked state and an unlocked state;
a seat mounted on the swivel;
a plurality of surface pressure sensors, each disposed along an outer surface of the seat and detecting a pressure distribution within a predetermined area of the outer surface; and
a controller configured to cause the lock mechanism to be unlocked automatically based on a change in pressure distribution or on a surface pressure that is detected by at least one of the plurality of surface pressure sensors;
wherein the seat includes:
a cushion portion including a cushion surface disposed facing upward; and
a seat back portion, disposed at a rear of the cushion portion, and including a backrest surface disposed facing forward;
the plurality of surface pressure sensors include:
a first surface pressure sensor disposed along the cushion surface; and
a second surface pressure sensor disposed along the backrest surface; and
the controller is configured to cause the lock mechanism to be unlocked based on a change in pressure distribution that is detected by the first surface pressure sensor and on a change in pressure distribution that is detected by the second surface pressure sensor; and
wherein the controller is configured to execute:
obtaining a shift amount of a center of gravity acting on the cushion surface based on the change in pressure distribution that is detected by the first surface pressure sensor;
obtaining a shift amount of a center of load acting on the backrest surface based on the change in pressure distribution that is detected by the second surface pressure sensor; and
causing the lock mechanism to be unlocked if the shift amount of the center of gravity is greater than a predetermined threshold value and the shift amount of the center of load is greater than a predetermined threshold value.

2. The vehicle according to claim 1, wherein:
the seat includes:
an arm rest portion disposed on a side of the seat back portion;
the plurality of surface pressure sensors include:
a third surface pressure sensor disposed along an outer peripheral surface of the arm rest portion; and
the controller is configured to cause the lock mechanism to be unlocked based on a change in pressure distribution that is detected by the second surface pressure sensor and on a change in pressure distribution or a surface pressure that is detected by the third surface pressure sensor.

3. The vehicle according to claim 2, wherein:
the controller is configured to execute:
obtaining a load acting on the arm rest portion based on the change in pressure distribution or the surface pressure that is detected by the third surface pressure sensor; and
causing the lock mechanism to be unlocked if the shift amount of the center of the load is greater than a predetermined threshold value and the load is greater than a predetermined threshold value.

4. The vehicle according to claim 1, wherein:
the seat includes:
an arm rest portion disposed on a side of the seat back portion;
the plurality of surface pressure sensors include:
a third surface pressure sensor disposed along an outer peripheral surface of the arm rest portion; and
the controller is configured to cause the lock mechanism to be unlocked based on a change in pressure distribution that is detected by the first surface pressure sensor, on a change in pressure distribution that is detected by the second surface pressure sensor, and on a change in pressure distribution or a surface pressure that is detected by the third surface pressure sensor.

5. The vehicle according to claim 4, wherein:
the controller is configured to execute:
obtaining a load acting on the arm rest portion based on the change in pressure distribution or the surface pressure that is detected by the third surface pressure sensor; and
causing the lock mechanism to be unlocked if at least two of the following conditions are satisfied: the shift amount of the center of gravity acting on the cushion surface is greater than a predetermined threshold value; the shift amount of the center of load acting on the backrest surface is greater than a predetermined threshold value; and the load acting on the arm rest portion is greater than a predetermined threshold value.

6. The vehicle according to claim 1, wherein each of the plurality of surface pressure sensors includes a capacitive pressure sensor.

7. A vehicle comprising:
a swivel;
a lock mechanism locking and unlocking the swivel to switch the swivel between a locked state and an unlocked state;
a seat mounted on the swivel;
a plurality of surface pressure sensors, each disposed along an outer surface of the seat and detecting a pressure distribution within a predetermined area of the outer surface; and
a controller configured to cause the lock mechanism to be unlocked automatically based on a change in pressure distribution or on a surface pressure that is detected by at least one of the plurality of surface pressure sensors;
wherein the seat includes:
a cushion portion including a cushion surface disposed facing upward;
a seat back portion, disposed at a rear of the cushion portion, and including a backrest surface disposed facing forward; and
an arm rest portion disposed on a side of the seat back portion;
the plurality of surface pressure sensors include:
a first surface pressure sensor disposed along the cushion surface; and a third surface pressure sensor disposed along an outer peripheral surface of the arm rest portion; and the control device is configured to cause the lock mechanism to be unlocked based on a change of a pressure distribution that is detected by the first surface pressure sensor and on a change of a pressure distribution or a surface pressure that is detected by the third surface pressure sensor; and wherein:

the controller is configured to execute:

obtaining a shift amount of a center of gravity acting on the cushion surface based on the change in pressure distribution that is detected by the first surface pressure sensor;

obtaining a load acting on the arm rest portion based on the change in pressure distribution or the surface pressure that is detected by the third surface pressure sensor; and causing the lock mechanism to be unlocked if the shift amount of the center of gravity is greater than a predetermined threshold value and the load is greater than a predetermined threshold value.

8. A vehicle comprising:

a swivel;

a lock mechanism locking and unlocking the swivel to switch the swivel between a locked state and an unlocked state;

a seat mounted on the swivel;

a plurality of surface pressure sensors, each disposed along an outer surface of the seat and detecting a pressure distribution within a predetermined area of the outer surface; and a controller configured to cause the lock mechanism to be unlocked automatically based on a change in pressure distribution or on a surface pressure that is detected by at least one of the plurality of surface pressure sensors;

wherein:

the controller further includes a measurement unit measuring a swivel speed of the seat; and the controller is configured to execute causing the lock mechanism to lock the swivel if the swivel speed of the seat becomes slower than a predetermined threshold value or the seat stops swiveling after the lock mechanism has been unlocked.

* * * * *